United States Patent [19]

Chen

[11] Patent Number: 5,402,552
[45] Date of Patent: Apr. 4, 1995

[54] HENGE CONNECTOR FOR PIVOTAL GLASSES TEMPLE

[75] Inventor: Chung-Feng Chen, Taipei, Taiwan, Prov. of China

[73] Assignee: Chau-Chen Industry Co., Ltd., Taipei Hsien, Taiwan, Prov. of China

[21] Appl. No.: 71,404

[22] Filed: Jul. 29, 1993

[51] Int. Cl.$^6$ .......................... E05F 1/08; G02C 5/22
[52] U.S. Cl. ........................... 16/228; 16/286; 351/153
[58] Field of Search ................. 16/228, 286; 351/153

[56] References Cited

U.S. PATENT DOCUMENTS 5,018,242  5/1991  Guy et al. ..................... 16/228

FOREIGN PATENT DOCUMENTS

| 0306446 | 3/1989  | European Pat. Off. | 351/153 |
| 2609816 | 7/1988  | France | 16/228 |
| 2641382 | 7/1990  | France | 16/228 |
| 2662516 | 11/1991 | France | 351/153 |
| 2684456 | 6/1993  | France | 16/228 |

Primary Examiner—Lowell A. Larson
Assistant Examiner—Donald M. Gurley
Attorney, Agent, or Firm—Browdy & Neimark

[57] ABSTRACT

An improved hinge connector for pivotal glasses temples is equipped with a hinge mounted onto a glasses frame and a pivot connector having a deep hole disposed at the rear portion thereof; ⊓-shaped block in which part of the pivot connector is housed; a spring and a rivet pin having a rivet head and a pole which is led through the spring with the pole having a number of grooves at the front end thereof. The front end of the pole is inserted into the deep hole of the pivot connector and is forged into permanent engagement with the pivot connector, and the spring is limited in place between the rivet head and the end of pivot connector and the end of the ⊓-shaped block whereby the temples of a glasses can be outwardly extended in excess of 90 degrees without breaking or damage.

1 Claim, 6 Drawing Sheets

HENGE CONNECTOR FOR PIVOTAL GLASSES TEMPLE

BACKGROUND OF THE INVENTION

The present invention relates to a pivotal hinge connector disposed at one end of the temples of a glasses which are pivotally engaged with a glasses frame so that the temples of a glasses can be foldably operated, and outwardly pivoted in excess of 90 degrees without breaking or disengagement from the frame.

Referring to FIG. 1, a hinge 11A is disposed on a glasses frame 60A. A pivot connector 12A having a deep threaded hole 122A at one end thereof is not only pivotally engaged with the hinge 11A but also engaged with a fixing mount 51A secured to a temple 50A at the other end. The fixing mount 51A has an opening 511A into which the end of the pivot connector 12A is inserted. A bolt 31A led through a spring 30A is inserted into the fixing mount 51A via an opening 512A at the opposite end thereof and is engaged with the threaded hole 122A of the pivot connector 12A whereby the temples of the glasses can be pivoted outwardly in excess of 90 degrees without breaking.

However, this prior art hinge assembly still has a problem to overcome; as the prior art hinge assembly is frequently used, the bolt 31A easily gets loose, and even is shot out of the fixing mount 51A by the spring 30A, causing the disengagement of the temple 50A from the glasses frame 60A.

SUMMARY OF THE INVENTION

Therefore, the primary object of the present invention is to provide an improved hinge connector for a temple of a glasses wherein the pivot connector of the present invention is pivotally engaged with a hinge secured to a glasses frame at one end and securedly associated with a rivet pin by forging so that the pivot connector can be firmly associated with the hinge without easy disengagement due to frequent operation thereof.

DETAILED DESCRIPTION OF THE PREFERRED EMBODIMENT

Figure 1:
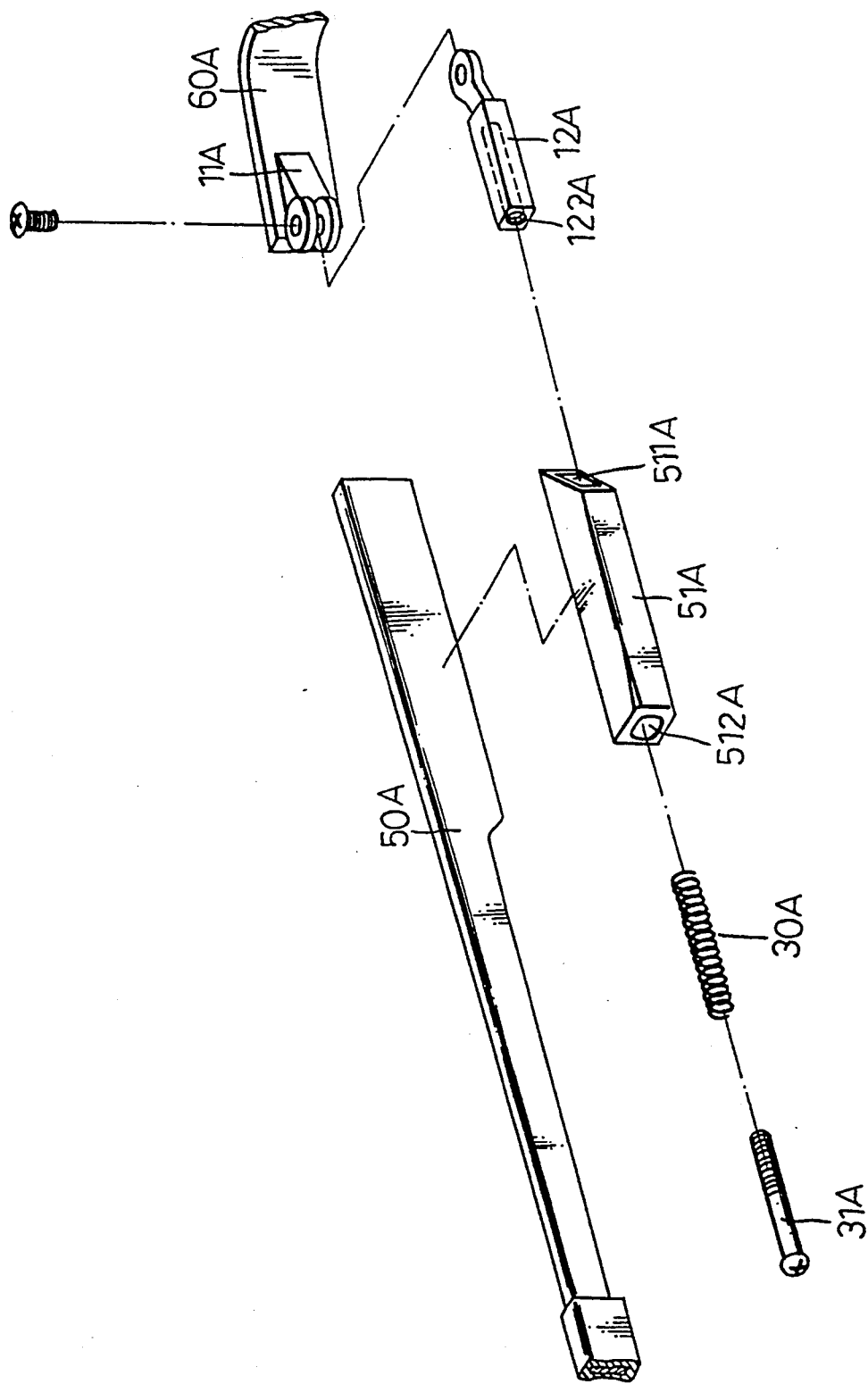
FIG. 1 is a perspective diagram showing the prior art structure of the hinge connector.
Figures 2, 2A:
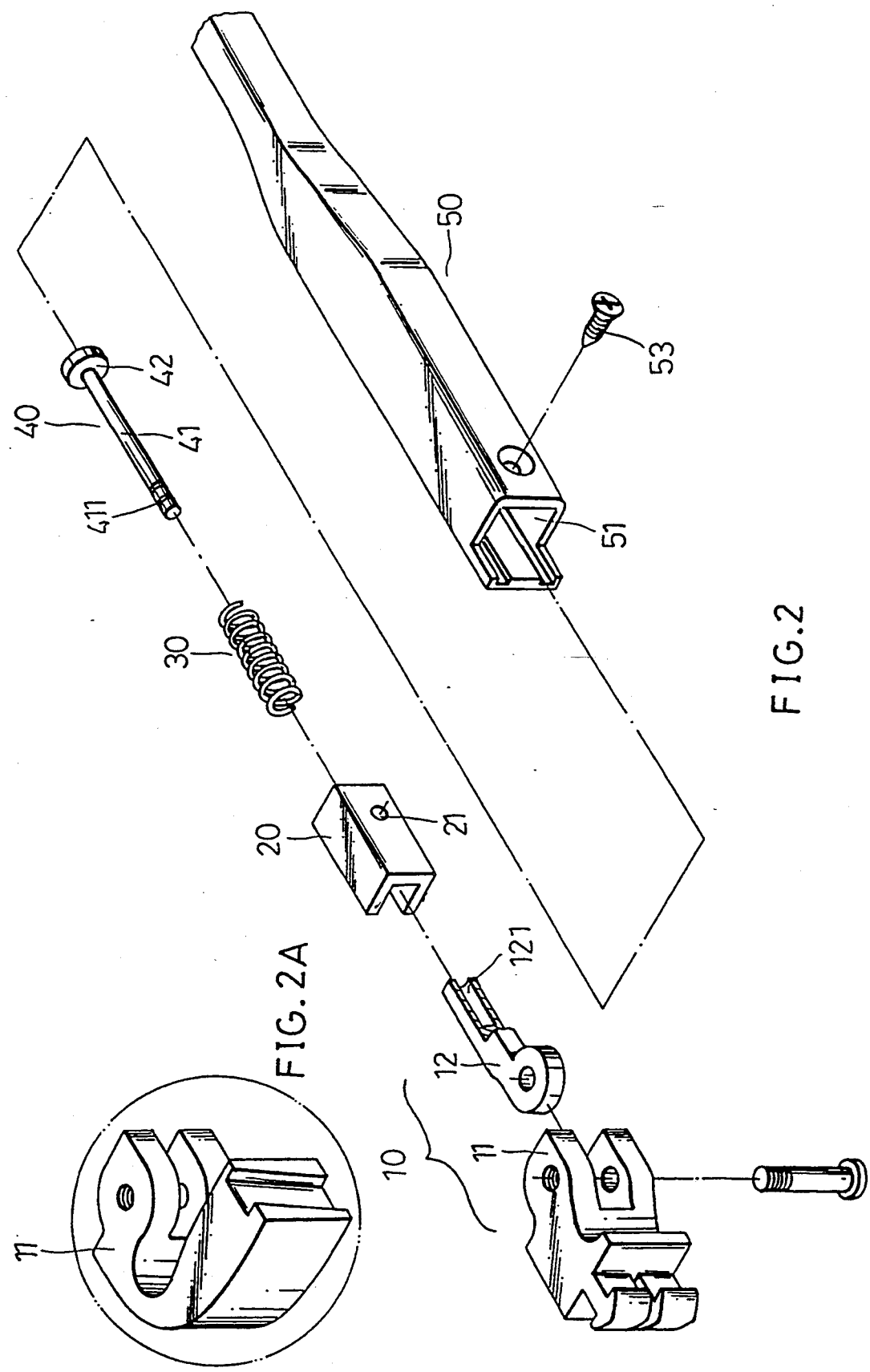
FIG. 2 is a perspective diagram showing the exploded components of the present invention.
FIG. 2A is a diagram showing an enlarged hinge of the present invention.

Referring to FIGS. 2, 2A the hinge connector assembly of the present invention is comprised of a hinge set 10 consisting of a hinge 11, a pivot connector 12 that are pivotally coupled together by a screw; a Π-shaped block 20, a spring 30, a rivet pin 40. The hinge 11 is secured to the rim of a glasses frame 60. The hinge 11 as shown in FIG. 2 is mounted to a plastic glasses frame; and the hinge 11 as illustrated in FIG. 2A is used on a metallic glasses frame.

The pivot connector 12 is associated with the front end of a temple 50 of a glasses. A through hole 121 disposed at one end of the pivot connector 12 permits the insertion of a rivet pin 40.

Engaged with the rear end, having the through hole 121, of the pivot connector 12 is the Π-shaped block 20 having an opened side into which the rear end of the pivot connector is inserted. A threaded hole 21 is disposed at the side wall of the block 20 so that the same can be led into an opening 51 disposed at the front end of the temple 50 and is locked in place by a screw 53.

Figure 3:
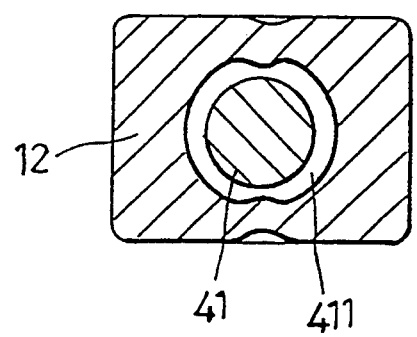
FIG. 3 is a sectional view of the hinge assembly of the temple of the present invention.

The rivet pin 40 having a pole 41 and a rivet head 42 is led through a spring 30 and the front end of the pole 41 having a number of grooves 411 disposed thereon is inserted into the through hole 121 of the pivot connector 12. As shown in FIG. 3, the pivot connector 12 with the pole 411 of the rivet pin 40 inserted into the hole 121 is forged so as to permit part of the pivot connector 12 fixedly engaged with the grooves 411 of the pole 41, causing the rivet pin 40 to permanently engage with the pivot connector 12. Onto the pole 41 of the rivet pin 40 is mounted the spring 30 having one end in abutment against the rivet head 42 and the other end in abutment against the end of the pivot connector 12.

Figure 4:
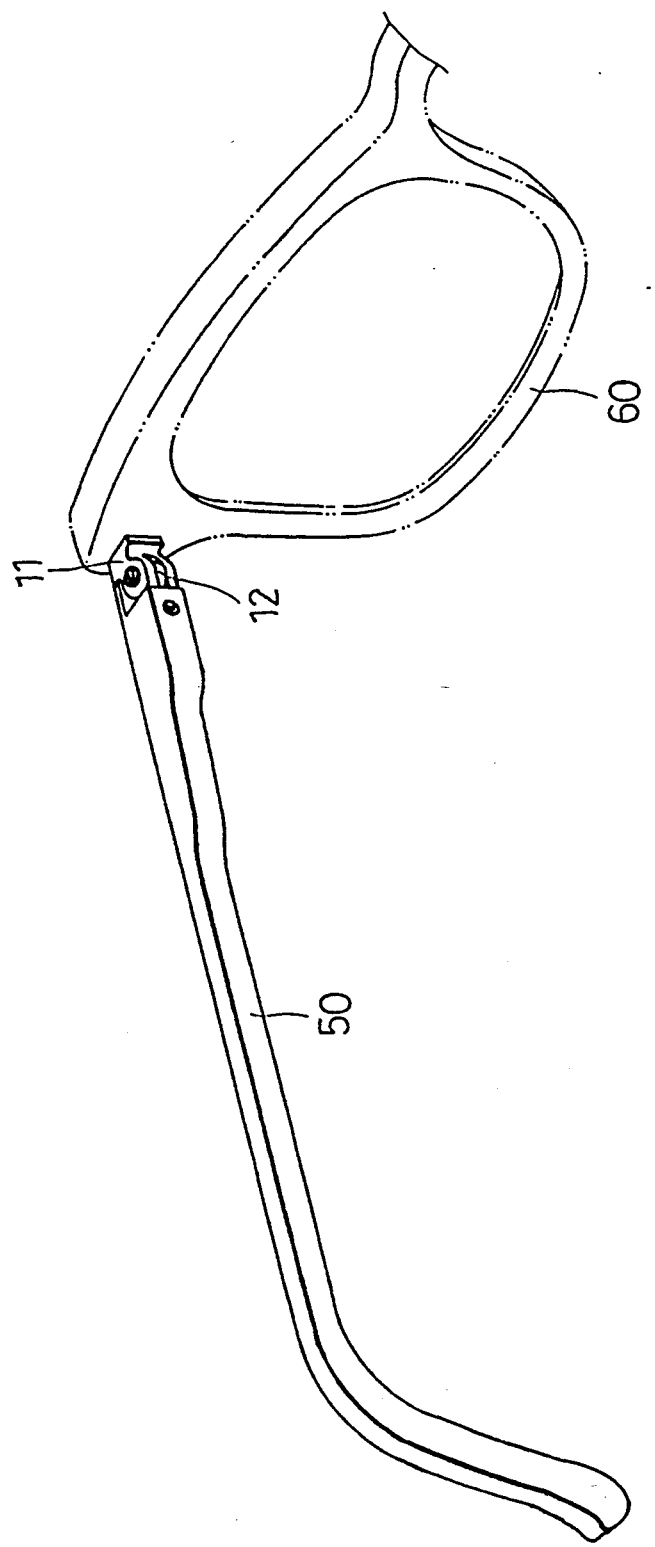
FIG. 4 is a diagram showing the application of the present invention to a glasses.
Figure 5:
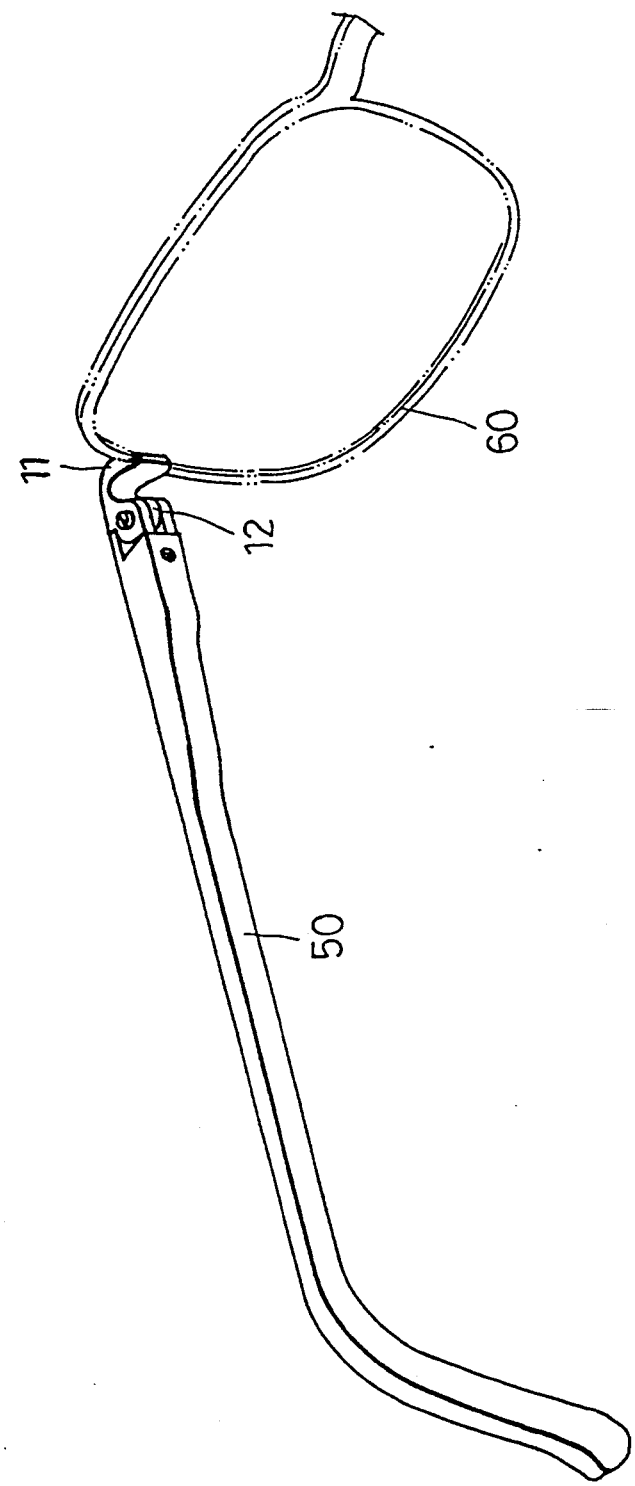
FIG. 5 is an application of the present invention to another glasses.

Referring to FIGS. 4, 5, the so assembled pivot connector 12, Π-shaped block 20, the spring 30 and the rivet pin 40 are inserted into the opening 51 of the temple 50 with a screw 53 engaging with the screw hole 21 of the Π-shaped block 20 so as to lock the same in the opening 51 of the temple.

Figure 6:
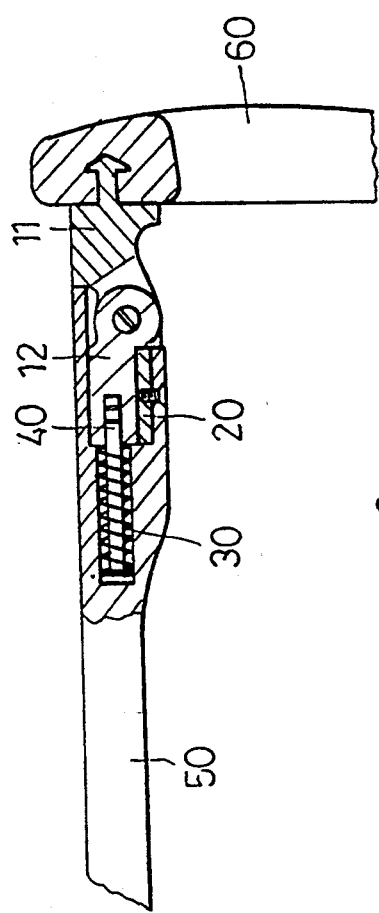
FIG. 6 is a sectional view showing the operation of the present invention.
Figure 7:
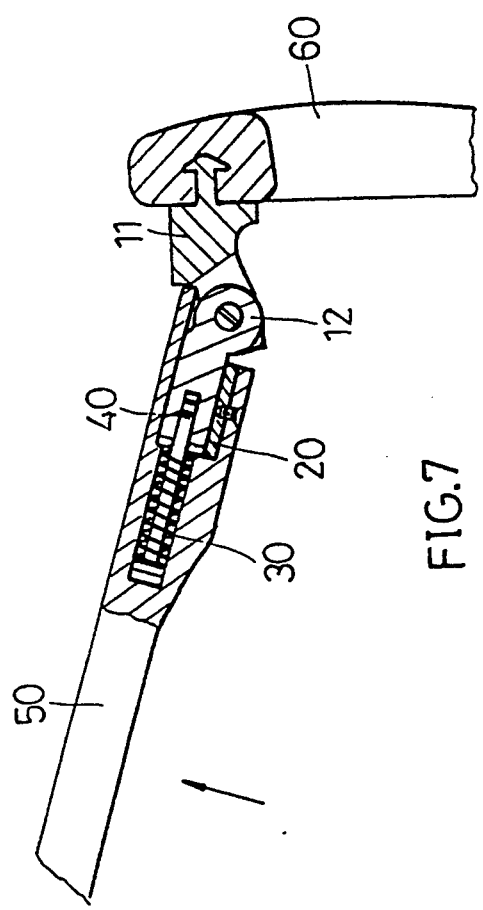
FIG. 7 is a sectional view showing the outward extension of the temple of a glasses.

Referring to FIGS. 6, 7, as the temple 50 of a glasses is outwardly extended in excess of 90 degrees at which the temple 50 and the glasses frame 60 are normally related to each other when extended in use, the Π-shaped block 20 will slide on the pivot connector 12, and the block 20 is moved in such a manner that the spring 30 is compressed by the Π-shaped block 20 against the rivet head 42, effectively protecting the temple from breaking. Moreover, the pivot connector 12 and the rivet pin 40 are fixed together by way Of forging so that the rivet pin 40 will not dismantle with ease, avoiding the disengagement of the temple 50 from the glasses frame 60.

I claim:

1. A hinge connector for eye glasses comprising:
   a hinge assembly having a hinge means and a pivot connector pivotally joined together;
   said hinge means being mounted to an eye glass frame;
   said pivot connector having a deep hole disposed on a rear portion thereof;
   a Π-shaped block having a side opening and a screw hole disposed opposite said side opening,
   said Π-shaped block being slideably engaged around said rear portion of said pivot connector,
   a rivet pin having a rivet head and a pole which has a number of grooves at one end thereof engaged within said deep hole,
   said pole and said pivot connector being forged together by force with said pivot connector in permanent locking engagement with said grooves of said pole,
   spring means slideably mounted around said pole, a temple having an opening at an end thereof and a hole therein extending transversely to said opening, said rivet pin, spring means and U - shaped block inserted into said opening of said temple and a screw fastened through said temple hole into said screw hole in said ⊓-shaped block to fix said temple to said U - shaped block, a first end of said spring means contacting both an end of said rear portion of said pivot connector and an end of said ⊓-shaped block and a second end of said spring means contacting said rivet head when said temple is in a normal opened position at an approximate 90° angle to said eye glass frame, wherein when said temple is opened wider than said normal position, said U - shaped block slides on said pivot connector compressing said spring means toward said rivet head relieving pressure on said temple.

* * * * *